US008230684B2

(12) United States Patent
Delavan

(10) Patent No.: US 8,230,684 B2
(45) Date of Patent: Jul. 31, 2012

(54) COMBUSTION ENGINE BREATHING SYSTEM INCLUDING A COMPRESSOR VALVE FOR A BITURBO WITH CYLINDER DEACTIVATION

(75) Inventor: Matthew B. Delavan, Rochester, MI (US)

(73) Assignee: BorgWarner Inc., Auburn Hills, MI (US)

( * ) Notice: Subject to any disclaimer, the term of this patent is extended or adjusted under 35 U.S.C. 154(b) by 556 days.

(21) Appl. No.: 12/105,392

(22) Filed: Apr. 18, 2008

(65) Prior Publication Data

US 2008/0256951 A1    Oct. 23, 2008

Related U.S. Application Data

(60) Provisional application No. 60/913,133, filed on Apr. 20, 2007.

(51) Int. Cl.
| | | |
|---|---|---|
| F02B 33/44 | (2006.01) | |
| F02B 33/00 | (2006.01) | |
| F16K 11/074 | (2006.01) | |
| F16K 11/085 | (2006.01) | |

(52) U.S. Cl. ................. 60/612; 123/562; 137/625.46; 137/625.47

(58) Field of Classification Search ............ 60/612; 123/562; 137/220, 514.5, 515.5, 625.46–625.47, 137/536; F02B 37/007, 37/00
See application file for complete search history.

(56) References Cited

U.S. PATENT DOCUMENTS

| | | | | |
|---|---|---|---|---|
| 3,194,255 | A | * | 7/1965 | Flaton et al. ............... 137/220 |
| 3,721,265 | A | * | 3/1973 | Hoffland .................. 137/625.47 |
| 4,638,832 | A | * | 1/1987 | Mokveld .................... 137/220 |
| 6,250,079 | B1 | | 6/2001 | Zander et al. ................ 60/602 |
| 6,715,289 | B2 | | 4/2004 | Mader et al. ................. 60/612 |
| 7,028,678 | B2 | * | 4/2006 | Betz et al. ................... 123/562 |
| 7,165,403 | B2 | * | 1/2007 | Sun et al. .................... 60/612 |
| 7,243,495 | B2 | * | 7/2007 | Whelan et al. .............. 60/605.2 |
| 7,255,129 | B2 | * | 8/2007 | Lopez ..................... 137/625.46 |
| 7,347,048 | B2 | * | 3/2008 | Albat ..................... 137/625.47 |
| 7,426,830 | B2 | * | 9/2008 | Schorn et al. ............... 60/612 |
| 7,588,047 | B2 | * | 9/2009 | Vogt ......................... 137/220 |
| 7,628,016 | B2 | * | 12/2009 | Vogt .......................... 60/612 |
| 2006/0048992 | A1 | | 3/2006 | Gansloser et al. | |
| 2006/0054848 | A1 | * | 3/2006 | Vogt ........................... 251/77 |
| 2006/0070382 | A1 | * | 4/2006 | Karlsson ..................... 60/612 |
| 2008/0216788 | A1 | * | 9/2008 | Henrich et al. ............. 123/562 |
| 2010/0139267 | A1 | * | 6/2010 | Schliesche et al. ........... 60/602 |
| 2010/0293922 | A1 | * | 11/2010 | Delavan et al. .......... 123/568.12 |
| 2010/0300088 | A1 | * | 12/2010 | Joergl et al. ................. 60/602 |

FOREIGN PATENT DOCUMENTS

| | | | |
|---|---|---|---|
| DE | 3101623 A1 | * | 10/1982 |
| DE | 19835594 A1 | * | 2/2000 |
| EP | 1662109 A1 | * | 5/2006 |
| JP | 04140424 A | * | 5/1992 |
| WO | WO 0151786 A1 | * | 7/2001 |

OTHER PUBLICATIONS

A machine translation DE 31 01 623 A1, published on Oct. 21, 1982.*

* cited by examiner

Primary Examiner — Thai Ba Trieu
(74) Attorney, Agent, or Firm — BrooksGroup

(57) ABSTRACT

One embodiment of the invention includes a combustion engine breathing system including a compressor valve for use with a biturbo system and cylinder deactivation.

17 Claims, 2 Drawing Sheets

COMBUSTION ENGINE BREATHING SYSTEM INCLUDING A COMPRESSOR VALVE FOR A BITURBO WITH CYLINDER DEACTIVATION

This application claims the benefit of U.S. provisional application Ser. No. 60/913,133, filed Apr. 20, 2007.

TECHNICAL FIELD

The field to which the disclosure generally relates includes combustion engine breathing systems having a biturbo system with cylinder deactivation.

BACKGROUND

Cylinder deactivation is growing in popularity, particularly for North American V6 and V8 engines. Biturbo "parallel non-sequential twin turbochargers" V6 engines are also growing in popularity.

SUMMARY OF EXEMPLARY EMBODIMENTS OF THE INVENTION

One embodiment of the invention includes a combustion engine breathing system including a compressor valve for use with a biturbo system and cylinder deactivation.

Another embodiment of the invention includes the combination of a combustion engine breathing system including parallel non-sequential twin turbochargers and a combustion engine constructed and arranged so that one or more cylinders may be deactivated.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the present invention will become more fully understood from the detailed description and the accompanying drawings, wherein.

DETAILED DESCRIPTION OF EXEMPLARY EMBODIMENTS

The following description of the embodiment(s) is merely exemplary in nature and is in no way intended to limit the invention, its application, or uses.

Figure 1:
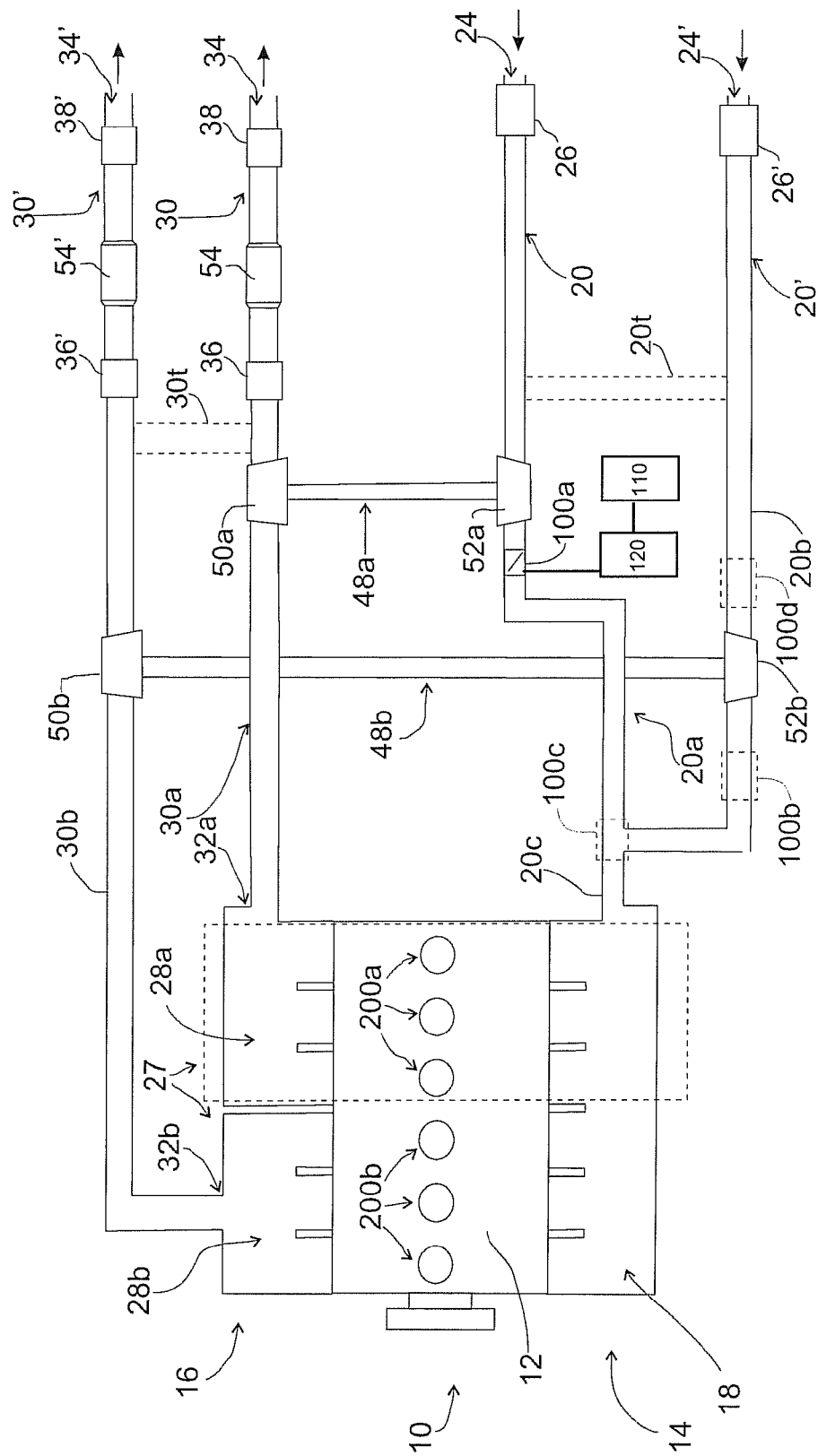
FIG. 1 illustrates a combustion engine breathing system according to one embodiment of the invention.

Referring now to FIG. 1, one embodiment of the invention includes a combustion engine breathing system 10 which may include one or more of the following components. In one embodiment the combustion engine breathing system 10 includes a combustion engine 12 having a first bank 200a of one or more cylinders and a second bank 200b of one or more cylinders. The engine 12 may be constructed and arranged so that at least one of the first bank 200a or the second bank 200b may be deactivated while the other bank remains activated to propel a vehicle. The combustion engine breathing system 10 may include an air intake side 14 which may include a primary air intake conduit 20 having an open end 24 and an air filter 26 at or near the open end 24. The primary air intake conduit 20 may include a first portion 20a, a second portion 20b and a third portion 20c constructed and arranged to deliver intake air to an intake manifold 18. The intake manifold 18 is constructed and arranged to deliver air to individual cylinders of the first bank 200a and the second bank 200b. In one embodiment, the first portion 20a and the second portion 20b are connected together by air conduit segment 20t and only a single primary air intake conduit 20 is provided. In another embodiment, air conduit segment 20t is not present and a secondary air intake conduit 20' with associated component 26' is provided for dual air intakes.

The combustion engine breathing system 10 may also include an exhaust gas side 16 including a combustion exhaust manifold 27 which may have a first portion 28a and a second portion 28b. The first portion 28a may be constructed and arranged to exhaust gas from the first bank of cylinders 200a. The second portion 28b of the exhaust manifold 27 may be constructed and arranged to exhaust gas from the second bank 200b of cylinders. The first portion 28a and the second portion 28b may be separate manifolds constructed and arranged so that exhaust from the first bank 200a of cylinders flows only through the first portion 28a of the exhaust manifold and only exhaust from the second bank 200b flows through the second portion 28b of the exhaust manifold. Alternatively, the first portion 28a and the second portion 28b may be combined so that exhaust from either of the first bank 200a or the second bank 200b may flow into either of the first portion 28a or second portion 28b of the manifold 27. The exhaust side 16 may further include a primary exhaust conduit 30 which may include a first portion 30a connected to the first portion 28a of the manifold. The primary exhaust conduit 30 may further include a second portion 30b connected to the second portion 28b of the exhaust manifold. The primary exhaust gas conduit 30 may have an open end 34 for exhausting gas to the atmosphere. A plurality of emission components including, but not limited to, a catalytic converter 36, particulate filter 54 and muffler 38 may be operatively connected to or made a part of the primary exhaust conduit 30. The combustion engine breathing system 10 may include a first turbocharger 48a including a first turbine 50a in fluid communication with the first portion 30a of the primary exhaust conduit 30. A first compressor 52a may be operatively connected to the first turbine 50a and may be in fluid communication with the first portion 20a of the air intake conduit 20.

A second turbocharger 48b may be provided having a second turbine 50b in fluid communication with the second portion 30b of the primary exhaust conduit 30. The second turbocharger 48b may include a second compressor 52b operatively connected to the second turbine 50b and wherein the second compressor 52b may be in fluid communication with the second portion 20b of the primary air intake conduit 20. In one embodiment, the first portion 20a and the second portion 20b of the primary air intake conduit 20 may be joined at the air intake manifold 18 or prior thereto and a third portion 20c of the primary air intake conduit 20 may deliver air from the first portion 20a and second portion 20b into the air intake manifold 18.

In one embodiment, the first portion 30a and the second portion 30b are connected together by exhaust conduit segment 30t and only a single primary exhaust conduit 30 is provided. In another embodiment, exhaust conduit segment 30t is not present and a secondary exhaust conduit 30' with associated components 36', 54' and 38' is provided for dual exhaust.

Figure 2:
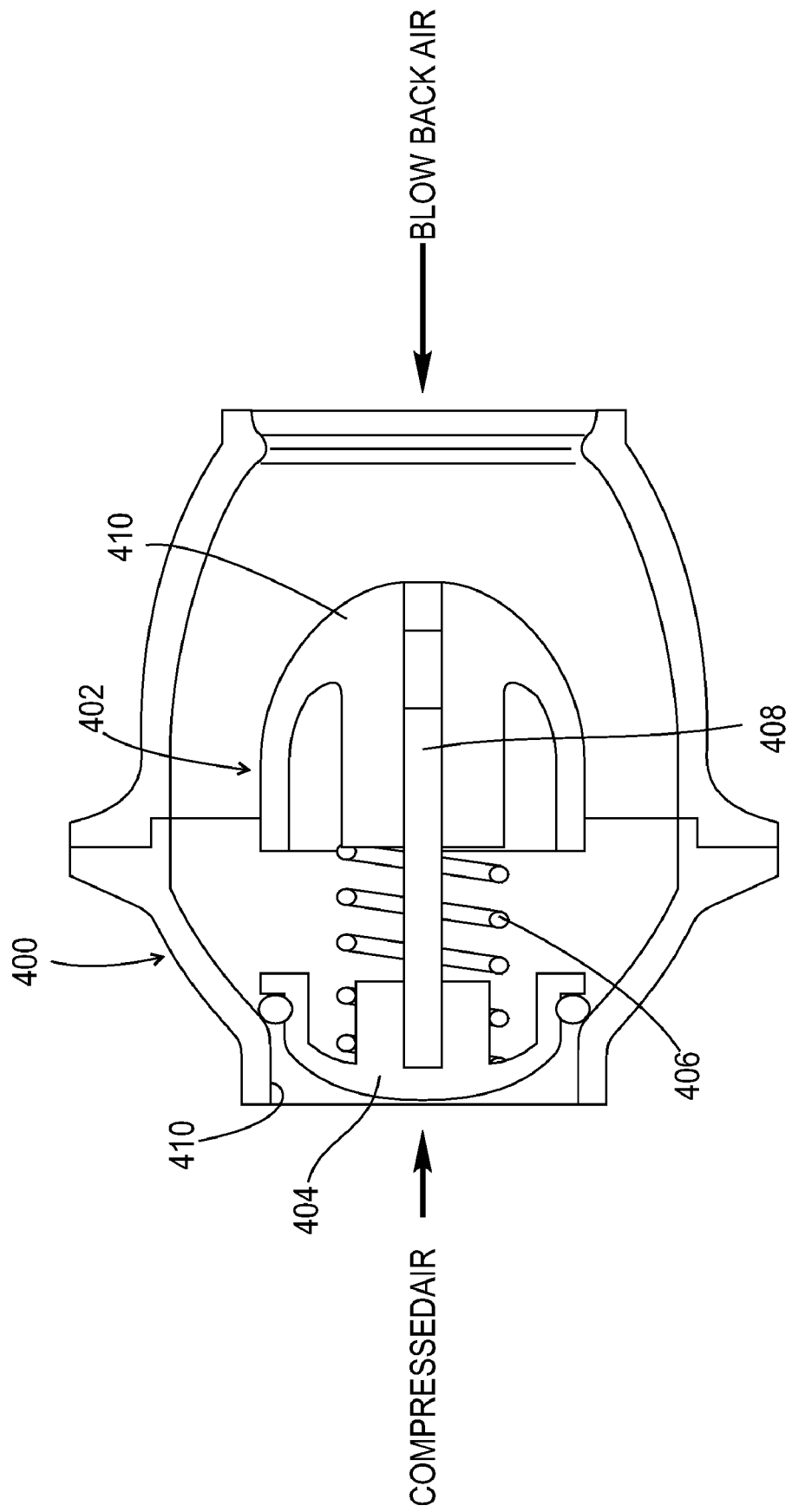
FIG. 2 illustrates one embodiment of a valve useful in one or more embodiments of the invention.

According to one embodiment of the invention, a valve 100a may be provided in the first portion 20a of the primary air intake conduit 20 at a location downstream of the first compressor 52a. The valve may be passive or active and is constructed and arranged to prevent blowback of gases through the first compressor 52a when the first bank 200a of cylinders is deactivated. The first valve 100a may be any form of a passive valve, including, but not limited to, a flap valve, or a spring loaded valve as shown in FIG. 2, which will be described in greater detail hereafter. Alternatively, the first valve 100a may be actively controlled by an electronic control unit such as a computer processor 110 and driven by an actuator 120.

In an alternative embodiment, a second valve 100b may be provided in the second portion 20b of the primary air intake conduit 20 at a location downstream of the second compressor 52b and positioned to prevent blowback of gases through the second compressor 52b in the event that the second bank 200b of cylinders is deactivated. Again, the second valve 100b may be identically constructed as the first valve 100a, and may be an active or passive valve. In still another embodiment, a valve 100d may be positioned in secondary air intake conduit segment 20' upstream of the second compressor 52b, and if desired, the portion of 20' and 24' upstream of the junction of conduit segment 20t and air intake conduit segment 20' may not be present so that only a single primary air intake conduit 20 is provided for air intake.

In still another alternative embodiment, a third valve 100c may be provided at the juncture of the first portion 20a and second portion 20b of the primary air intake conduit 20. The third valve 100c may be a three-way valve driven by an actuator that is controlled by an electronic control unit or module to selectively open or close the first portion 20a or second portion 20b of the primary air intake conduit to prevent the blowback of gas through the first compressor 52a or the second compressor 52b.

The present invention may be utilized in connection with any type of combustion engine, including but not limited to, gasoline or diesel engines, including any type of cylinder configuration such as, but not limited to inline cylinders or V-shaped configurations of the cylinders.

In one embodiment of the invention the valves 100a, and/or 100b may be passive such as a flap valve including an electronic flap that allows the flow of compressed air in one direction from the compressor 52a or compressor 52b towards the combustion engine 12 but prevents flow through the valve in the opposite direction.

In one embodiment, the valve 100a or 100b may be a passive valve including a biasing means, such as a spring to position the valve in a closed position. Such a passive valve may be provided as shown in FIG. 2 and may include a conduit 400 having a valve 402 positioned therein. The valve 402 may include a plug 404 constructed and arranged to engage the inside wall 410 of the conduit 400. The plug 404 may be connected to a shaft 408 carried by a bracket 410 for slidable movement therein. A coil spring 406 may be provided around the shaft 408 engaging the bracket 410 on one end and the plug 404 on the other end to bias the plug 404 against the inner wall 410 of the conduit 400. Compressed air from one of the compressors 52a or 52b may blow through the conduit 400 forcing the plug 404 away from the inner wall 410 so that air may flow past the passive valve and into the combustion engine 12. However, blowback air, created when one of the cylinder banks 200a or 200b is deactivated, cannot flow past the plug 404 which is biased against the inner wall 410 of the conduit 400.

The above description of embodiments of the invention is merely exemplary in nature and, thus, variations thereof are not to be regarded as a departure from the spirit and scope of the invention.

What is claimed is:

1. The combustion engine breathing system comprising:
   a multi-cylinder combustion engine constructed and arranged so that one or more of the cylinders is deactivatable;
   parallel twin turbochargers constructed and arranged to charge a common air intake conduit with two non-sequential compressors; and
   a valve positioned in-line with one compressor that closes to prevent a backflow of gas through the one compressor from the other of the two compressors when the other one compressor turbochargers is not operating, wherein each cylinder routes exhaust gas to only one of the turbochargers.

2. A combustion engine breathing system comprising:
   a multi-cylinder combustion engine constructed and arranged so that one or more of the cylinders is deactivatable;
   parallel twin turbochargers constructed and arranged to charge a common air intake conduit with two non-sequential compressors; and
   a valve positioned in-line with one compressor that closes to prevent a backflow of gas through the one compressor from the other of the two compressors when the other one compressor turbochargers is not operating, wherein each cylinder routes exhaust gas to only one of the turbochargers,
      wherein the valve includes a three-way valve positioned at the common air intake conduit to selectively prevent the backflow of gas to through either one of the compressors when the other of the compressors is not operating.

3. A combustion engine breathing system comprising:
   a combustion exhaust gas side including a primary exhaust gas conduit having a first portion and a second portion, an air intake side including a primary air intake conduit including a first portion and a second portion, a first turbocharger including a first turbine operatively connected to the first portion of the primary exhaust conduit and a first compressor operatively connected to the first turbine, and wherein the first compressor is in fluid communication with the first portion of the primary air intake conduit;
   a second turbocharger including a second turbine in fluid communication with the second portion of the primary exhaust conduit and a second compressor operatively connected to the second turbine, and wherein the second compressor is in fluid communication with the second portion of the primary air conduit;
   a combustion engine including a first bank of one or more combustion cylinders and a second bank of one or more combustion cylinders, and wherein the combustion engine is constructed and arranged so that at least one of the first bank or the second bank is deactivatable, and wherein the engine takes in air through the air intake side and exhausts combustion gases through the combustion exhaust gas side; intake conduit, wherein the first portion and the second portion of the primary air intake conduit are joined at a juncture located upstream of the air intake manifold; and
   a valve constructed and arranged to prevent backflow of gas through one of the first compressor or second compressor when one of the first bank or second bank of one or more cylinders is deactivated, wherein the valve is positioned at the juncture.

4. A combustion engine breathing system comprising:

a multi-cylinder combustion engine constructed and arranged so that one or more of the cylinders is deactivatable;

parallel twin turbochargers constructed and arranged to charge a common air intake conduit with two non-sequential compressors; and a valve positioned in-line with one compressor that closes to prevent a backflow of gas through the one compressor from the other of the two compressors when the other one compressor turbochargers is not operating, wherein each cylinder routes exhaust gas to only one of the turbochargers, and further comprising a second valve positioned in-line with the other one on the compressors that closes to prevent the backflow of gas through the other one of the compressors when the other one of the compressors is not operating.

5. The combustion engine breathing system as set forth in claim 4 wherein at least one of the valves is located downstream from the compressor through which it prevents backflow when closed.

6. A combustion engine breathing system comprising:

a combustion exhaust gas side including a primary exhaust gas conduit having a first portion and a second portion, an air intake side including a primary air intake conduit including a first portion and a second portion, a first turbocharger including a first turbine operatively connected to the first portion of the primary exhaust conduit and a first compressor operatively connected to the first turbine, and wherein the first compressor is in fluid communication with the first portion of the primary air intake conduit;

a second turbocharger including a second turbine in fluid communication with the second portion of the primary exhaust conduit and a second compressor operatively connected to the second turbine, and wherein the second compressor is in fluid communication with the second portion of the primary air conduit;

a combustion engine including a first bank of one or more combustion cylinders and a second bank of one or more combustion cylinders, and wherein the combustion engine is constructed and arranged so that at least one of the first bank or the second bank is deactivatable, and wherein the engine takes in air through the air intake side and exhausts combustion gases through the combustion exhaust gas side; and a valve constructed and arranged to close and thereby prevent backflow of gas through one of the first compressor or the second compressor when one of the first bank or second bank of one or more cylinders is deactivated, wherein the valve is positioned to prevent backflow of gas to the first compressor, and further comprising another valve position to prevent backflow of gas to the second compressor.

7. The combustion engine breathing system as set forth in claim 6 wherein the valve is a passive valve.

8. The combustion engine breathing system as set forth in claim 7 wherein the valve comprises a flap valve.

9. The combustion engine breathing system as set forth in claim 7 wherein the valve comprises a spring for biasing a plug in a closed position to prevent backflow of gas to one of the first compressor or second compressor when one of the first bank or second bank of one or more cylinders is deactivated.

10. The combustion engine breathing system as set forth in claim 6 wherein the valve is an active valve.

11. The combustion engine breathing system as set forth in claim 6 wherein the valve is positioned in the first portion of the primary air intake conduit to prevent backflow of gas to the first compressor.

12. The combustion engine breathing system as set forth in claim 6 wherein the valve is positioned to prevent backflow of gas to the second compressor.

13. The combustion engine breathing system as set forth in claim 12 wherein the valve is positioned in the second portion of the primary air intake conduit.

14. The combustion engine breathing system as set forth in claim 12 wherein the air intake side further comprises a secondary air intake conduit upstream of the second compressor and wherein the valve is positioned in the secondary air intake conduit.

15. The combustion engine breathing system as set forth in claim 6 wherein the valve is positioned to prevent backflow of gas to the first compressor, and further comprising another valve positioned to prevent backflow of gas to the second compressor.

16. The combustion engine breathing system as set forth in claim 3 wherein the juncture is located downstream of the first compressor and the second compressor.

17. The combustion engine breathing system as set forth in claim 3 wherein the valve comprises a three-way valve constructed and arranged to selectively prevent backflow of gas from one of the first portion or second portion of the primary air intake conduit to the other of the first portion or second portion of the primary air intake conduit.

* * * * *